(No Model.)
E. SEITZ.
BEER COOLER.
No. 539,708. Patented May 21, 1895.
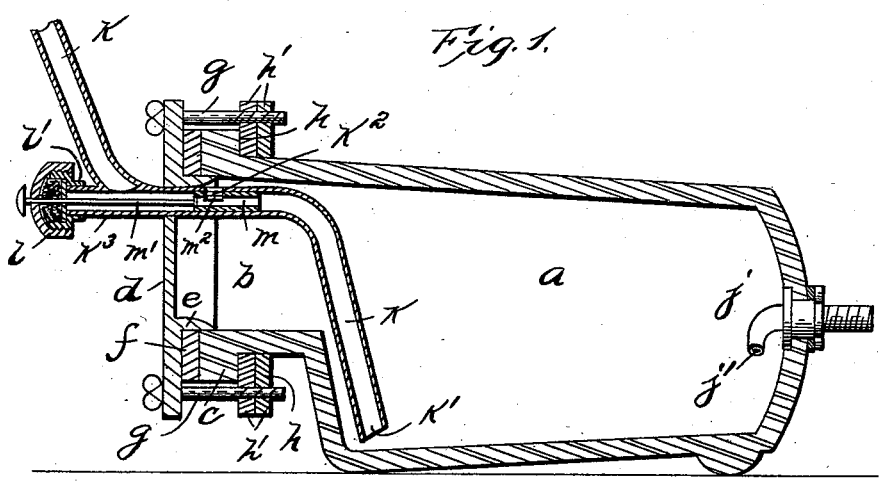
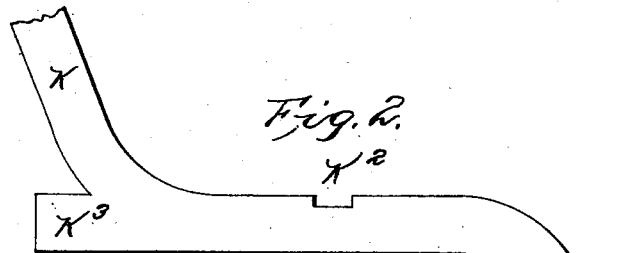
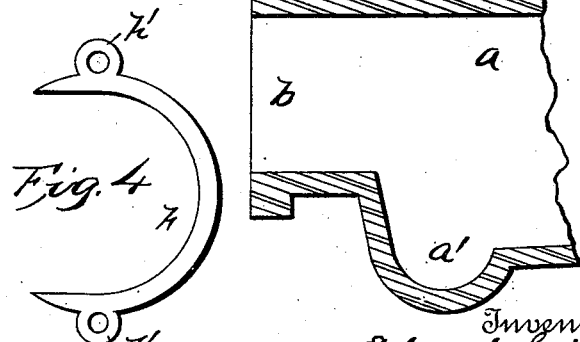
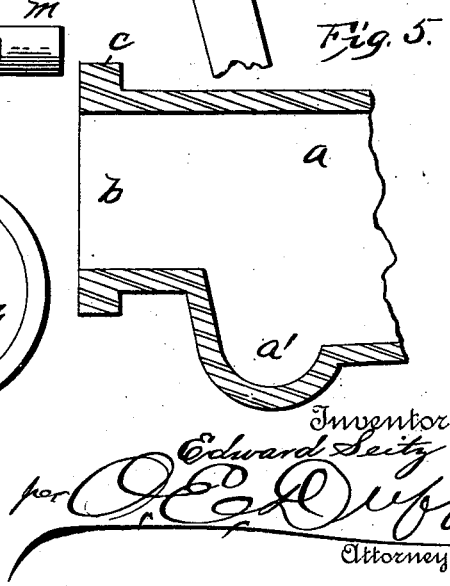
Witnesses
E. E. Duffy
Hubert Peck
Inventor
Edward Seitz
per O. E. Duffy
Attorney

UNITED STATES PATENT OFFICE.

EDWARD SEITZ, OF PEORIA, ILLINOIS.

BEER-COOLER.

SPECIFICATION forming part of Letters Patent No. 539,708, dated May 21, 1895.

Application filed January 30, 1895. Serial No. 536,700. (No model.)

*To all whom it may concern:*

Be it known that I, EDWARD SEITZ, of Peoria, in the county of Peoria and State of Illinois, have invented certain new and useful Improvements in Beer-Coolers; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in beer coolers.

The object of the invention is to provide a beer cooler, simple, durable and economical in construction and very effective in action, and so formed and constructed that the cooler can be maintained completely full of beer and can be entirely emptied when desired.

A further object of the invention is to provide a beer cooler having the outlet pipe extending to the lowest portion of the interior thereof and provided with an outlet vent from the highest portion of the interior of the cooler controlled by the valve operative from the interior of the cooler.

A further object of the invention is to provide certain improvements in details of constructions and in arrangements and combinations of parts whereby a highly efficient beer cooler is provided.

Referring to the accompanying drawings, Figure 1 is a longitudinal vertical section of the improved beer-cooler. Figs. 2 and 3 are detail views of a portion of the outlet and the controlling-valve therein, respectively. Fig. 4 is a plan view of one of the holding devices for securing the cover of the cooler. Fig. 5 is a detail section of a different form of receptacle.

In the drawings, $a$, is a closed vessel constituting a beer cooler and adapted to be located in an ice box or in contact with ice or cooling mediums. This vessel is preferably arranged in a horizontal position, but my invention is not limited to the employment of the horizontal vessel, as a vessel can be arranged vertically or otherwise if desired. As shown, the vessel is smaller at its rear end than at its front end and gradually tapers from one end to the other, so that the lowest and highest points of the interior of the vessel are located at the front end thereof. At its rear end the vessel can be provided with a suitable rest to slightly raise the rear end thereof and hold the vessel in the proper position.

The mouth $b$, of the vessel opens through the upper portion of the front end thereof so that the upper side of the vessel is preferably straight and continues through the neck of the mouth as shown. The neck preferably has the flange $c$, at its outer side.

$d$, is a cover preferably having an internal flange $e$, extending into the neck or mouth. Suitable packing $f$, is located around this flange to rest around the mouth of the vessel and prevent leakage beneath the cover.

$g$, are screws or bolts passing through the outer portion of the cover and into the divided rings $h$, embracing the neck of the bottle at the inner side of the flange so that the cover can be tightly clamped. Two of these divided rings are employed slipped on to the neck of the bottle from opposite sides so that their perforated ears $h'$ register, and the clamping bolts can be passed therethrough and hold the rings and cover locked in position.

$j$, is an inlet suitably secured in the rear end of the collar and formed at its outer end for coupling with the pipe from the beer keg. The inner end $j'$, of this inlet is curved or bent transversely so as to impart a twisting or rotating movement of the body of liquid in the cooler.

$k$, is an inlet pipe passing through and carried by the cover at the front end of the cooler and at its outer end formed for coupling with the pipe to the faucet. From the cover this pipe extends downwardly within the cooler with its lower open inlet end $k'$, at the lowest portion of the cooler, which in the present instance is at the front end thereof. This outlet pipe passes through the upper part of the cover and into the cooler at the uppermost part of the interior thereof. Within the cooler the said outlet pipe is provided with a side opening $k^2$ at the highest point in the cooler. The said outlet tube is straight for a short distance inwardly from said side opening and from thence outwardly where it is provided with the branch or side opening $k^3$ at the front end of the cooler. This opening or branch is provided with a suitable screw threaded cap $l$, secured on to the nut or coupling $l'$, on the end of the branch and provided with internal packing to close the outer end of the branch. Within the straight portion of the outlet tube, at said side opening therein, in the cooler, a horizontal valve $m$ is arranged. This valve is suitably packed as to snugly fit and form a tight joint with the interior of the tube, and is preferably hollow so that the liquid can freely pass therethrough. The valve has an outwardly extending stem $m'$, passed loosely through said cap and at the exterior of said branch provided with a handle. By this means the valve can be moved longitudinally in the tube to close or open said side port. If desired the valve can have a side port $m^2$, to register with the side port in the outlet pipe so that the valve can close or open the port in the outlet pipe by being turned or rotated. In ordinary use the valve is adjusted to open the side port in the outlet pipe from the cooler and the air pressure applied in the beer keg forces the beer into the cooler and completely fills the same as the said side port permits escape of all air from the cooler and being at the highest point in the cooler prevents accumulation of air therein. It will thus be seen that the cooler can be filled with beer and to be kept full while there is beer in the keg. When the beer is exhausted from the keg the said valve is operated to close the side port in the beer outlet pipe from the cooler and all of the beer can be forced from the cooler through the lower open end of the outlet pipe in the lowest portion of the cooler where the beer collects.

I prefer the construction of beer cooling vessel shown in Fig. 5, wherein the front end of the vessel has the bottom depression $a'$, forming the lowest point of the interior and into which the outlet pipe extends, the bottom of the vessel inclining to said recess.

It is evident that various changes might be made in the forms, arrangements and constructions of the parts described without departing from the spirit and scope of my invention. Hence I do not wish to limit myself to the exact construction herein set forth, but consider myself entitled to all such changes as fall within the spirit and scope of my invention.

Having thus fully described my invention, what I claim as new, and desire to secure by Letters Patent of the United States, is—

1. The combination of the vessel, and the outlet pipe therefrom having a permanently open inlet port in the lowest portion of the interior of the vessel and having an inlet port into the highest portion of the interior of the vessel, and a valve for closing and opening said last mentioned inlet port operative from the exterior of the vessel, substantially as described.

2. A vessel having the highest and lowest portions of its interior at its front end, in combination with the outlet pipe extending in through the upper part of the vessel and downwardly in the vessel with its lower open end in the lowest part of the interior of the vessel, said pipe having a side port at the highest portion of the interior of the vessel, and means, substantially as described, for controlling said port, substantially as described.

3. A vessel in combination with the outlet pipe extending into the upper part of the vessel and then downwardly therein to the bottom of the vessel, the straight upper portion of the pipe in the vessel having a side port and a straight outward branch at the exterior of the vessel, a hollow valve in the pipe controlling said port and the stem for controlling the valve and extending outwardly through said branch, substantially as described.

4. A beer cooler comprising the horizontally disposed vessel gradually decreased in size from the front end to the rear end, and having the inlet opening at its rear end, a closure for its front end and the beer outlet pipe passing through said closure, the cooler being so arranged that its highest and lowest portions are arranged at the front end thereof.

5. A horizontally disposed beer cooler having its front end larger than its rear end so that its highest and lowest points are at its front end, the neck and mouth of the cooler being arranged at its upper portion of the front end so that the upper side of the interior of the cooler is continuous through said neck, a closure for the neck, and inlet and outlet pipes.

In testimony that I claim the foregoing as my own I affix my signature in presence of two witnesses.

EDWARD SEITZ.

Witnesses:
JOHN SCHULER,
JAMES M. MORSE.